United States Patent [19]

Keller et al.

[11] 3,742,385

[45] June 26, 1973

[54] CROSS-COUPLED COMPLEMENTARY TRANSISTOR CIRCUIT FOR SINGLE COIL ELECTRO-MECHANICAL OSCILLATOR

[75] Inventors: Hans Keller; Wolfgang Sauer, both of Freiburg, Germany

[73] Assignee: ITT Industries, Inc., New York, N.Y.

[22] Filed: Feb. 18, 1972

[21] Appl. No.: 227,369

[30] Foreign Application Priority Data

Mar. 3, 1971 Germany.................. P 21 10 023.2

[52] U.S. Cl.............. 331/116 M, 58/23 A, 318/128

[51] Int. Cl........................... G04c 3/00, H03b 5/30

[58] Field of Search................ 331/116 M; 58/23 A, 58/23 AC, 28 A; 318/128, 132

[56] References Cited

UNITED STATES PATENTS 3,046,460 7/1962 Zemla............................ 58/23 A X 3,530,662 9/1970 Schöninger......................... 58/23 R

*Primary Examiner*—Roy Lake

*Assistant Examiner*—Siegfried H. Grimm

*Attorney*—C. Cornell Remsen, Jr., Menotti J. Lombardi et al.

[57] ABSTRACT

This is a circuit for driving an electro-mechanical oscillator having one coil and two complementary transistors. The emitter resistor of the control transistor is connected to that end of the coil not facing the supply voltage. The emitter capacitor of the control transistor is connected to the supply voltage. A resistor is connected between the coil and the collector of the driving transistor. An auxiliary transistor complementary to the driving transistor is provided so that the base is connected to the connecting point of the resistor and the coil.

2 Claims, 4 Drawing Figures

CROSS-COUPLED COMPLEMENTARY TRANSISTOR CIRCUIT FOR SINGLE COIL ELECTRO-MECHANICAL OSCILLATOR

BACKGROUND OF THE INVENTION

This invention relates to a circuit arrangement comprising two complementary transistors for maintaining the oscillations of electro-mechanical oscillators (balance wheels, tuning forks, pendula, etc.) with the aid of one single coil and a magnet system which are moved in relation to one another by the oscillator, with the coil being arranged in the collector circuit of the one transistor (driving transistor), the base of the other transistor (control transistor) being coupled to the collector of the driving transistor, and the base of the driving transistor being coupled to the collector of the control transistor.

For maintaining the oscillations of electro-mechanical oscillators as used for example in clocks or watches as balance wheels, tuning forks, pendula, etc., it is known to use electronic transistor circuits. These circuits may be divided into two classes, namely those employing two coils — i.e., one control and one driving coil — for maintaining the mechanical oscillation and those requiring only one single (driving) coil.

Single-coil circuits for clock and watch drives usually contain two complementary transistors, i.e., one driving transistor in the collector branch of which there is connected the (driving) coil, and one control transistor with the base thereof, via suitable circuit elements, being connected to the collector of the driving transistor, and with the collector thereof, via further circuit elements, if necessary, being connected to the base of the driving transistor.

In such types of circuits there will result some advantages when the coupling between the two transistors is effected with respect to direct current. Circuits of this kind are known from, e.g., the French Pat. No. 1,447,424 and the French published Pat. application Ser. No. 2,000,706.

By way of example there is shown in FIG. 1 of the accompanying drawings, the circuit according to the aforementioned French patent application. In the collector branch of the driving transistor T1 there is arranged the only coil L which, on one hand, is connected to the collector of the driving transistor T1 and, on the other hand, to the source of supply voltage $U_B$. The base of the complementary control transistor T2 is connected via the resistor R2 to the collector of the driving transistor T1 and, via the resistor R1 to earth or mass potential. The base of the driving transistor T1 and the collector of the control transistor T2 are connected to one another directly. The emitter of the driving transistor T1 is applied to the circuit ground (i.e. earth potential) while the emitter of the control transistor T2 is connected to the source of supply voltage $U_B$.

The coil cooperates with a not shown magnetic system which induces voltages in the coil and whereupon a magnetic field is generated by the coil, which field drives the mechanical oscillator as soon as both the coil and the magnet system are moved in relation to one another.

One disadvantage of the aforementioned known types of circuits is that DC coupling between the driving and the control transistor acts as a regenerative feedback so that, in the case of an unfavorable dimensioning, the two transistors may be permanently switched on or driven into saturation. In particular, this danger exists when the current gains of the two transistors and/or the resistance values of the coupling resistors have great tolerances, as is likely to be the case, for example, when arranging such circuits as monolithic integrated circuits (IC's).

An improvement can be achieved by connecting a feedback resistor into the emitter branch of the control transistor. In order thus not to reduce the AC gain as well, this resistor is appropriately bridged by a capacitor. This configuration is shown in FIG. 2. In the emitter circuit there are arranged both the resistor R3 and the capacitor C as connected parallel in relation thereto, with this parallel arrangement at one end being connected to the emitter of the control transistor T2, at the other end being connected to the source of supply voltage.

For causing the capacitor C to become effective, it must have a minimum capacitance value. On the other hand, however, the time constant of the RC-circuit may not be too high, because otherwise the capacitor C will be charged increasingly via the pulse-shaped emitter current of the control transistor T2. Therefore, both the value of the emitter resistor and also its protective effect are restricted.

SUMMARY OF THE INVENTION

It is the object of the invention to provide a circuit in which the two transistors are not permanently switched on.

According to a broad aspect of the invention there is provided a circuit arrangement for driving an electromechanical oscillator, said oscillator including a magnet system and a single coil mechanically coupled thereto, a source of supply voltage, a driving transistor, a control transistor of complementary conductivity type to that of said drive transistor, one end of said coil coupled to the collector of said drive transistor, the base of said control transistor being coupled to the collector of said drive transistor, the base of said drive transistor being coupled to the collector of said control transistor, the emitter of said control transistor being AC coupled to one pole of said source of supply voltage and DC coupled to said one end of said coil, a capacitor, the emitter of said control transistor being coupled to said one pole of said source of supply voltage via said capacitor, a first ohmic resistor, the emitter of said control transistor being DC coupled to said one end of said coil via said first ohmic resistor wherein the improvement comprises a second ohmic resistor coupled between the collector of said driving transistor and said one end of said coil and an auxiliary transistor which is complementary to the driving transistor, the base of said auxiliary transistor connected to the junction of said coil and said second resistor, the collector of said auxiliary transistor connected to the other pole of said source of supply voltage, the emitter of said auxiliary transistor being connected to the junction of said first ohmic resistor and said capacitor.

DESCRIPTION OF THE PREFERRED EMBODIMENT

Figure 1:
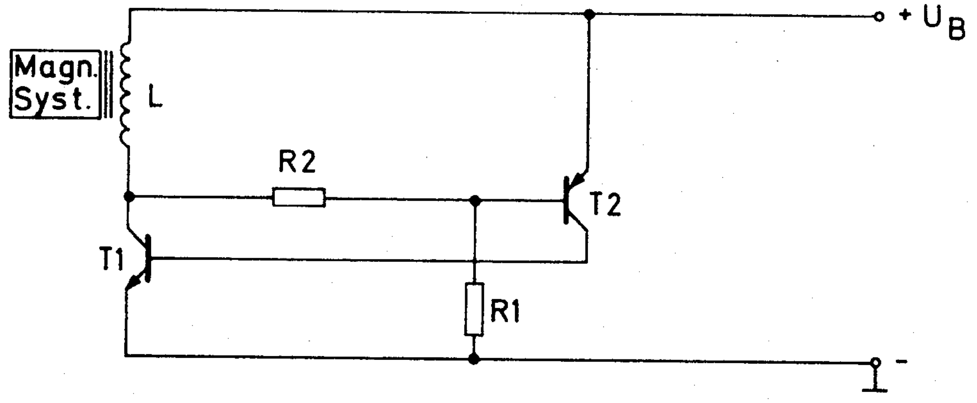
Fig. 1 PRIOR ART
FIGS. 1 and 2 show conventional circuit arrangements.
Figure 2:
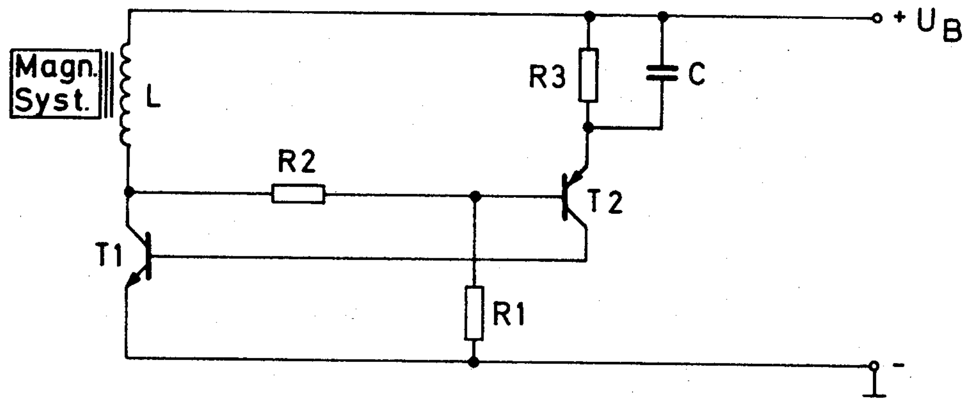
Fig. 2 PRIOR ART
Figure 3:
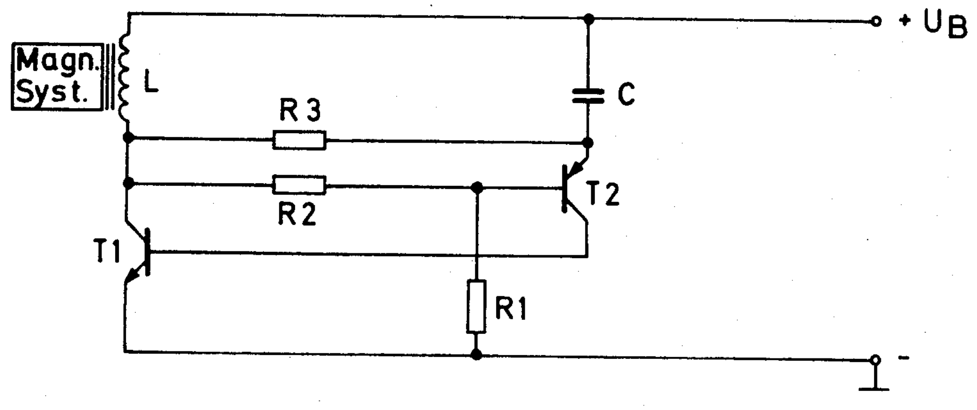
FIG. 3 shows an inventive circuit embodiment.

Referring to FIG. 3, the emitter resistor R3 according to FIG. 2 is in this case no longer connected with its emitter-distant end to the source of supply voltage $U_B$ but is connected in the inventive manner to the collector sided end of the coil L, and hence in the shown example of embodiment, also to the collector of the driving transistor T1.

Experiments have shown that the inventive measure of connecting the emitter resistor of the control transistor to the collector-sided end of the coil, has no disadvantageous influence upon the pulse operation of the circuit, as one would tend to expect at first. In fact, the circuit arrangement according to the invention offers the considerable advantage that even in the case of great tolerances of the characteristics of the employed components, both transistors are not permanently switched on, which would prevent the electromechanical oscillator from receiving driving pulses and would cause its oscillations to cease.

Figure 4:
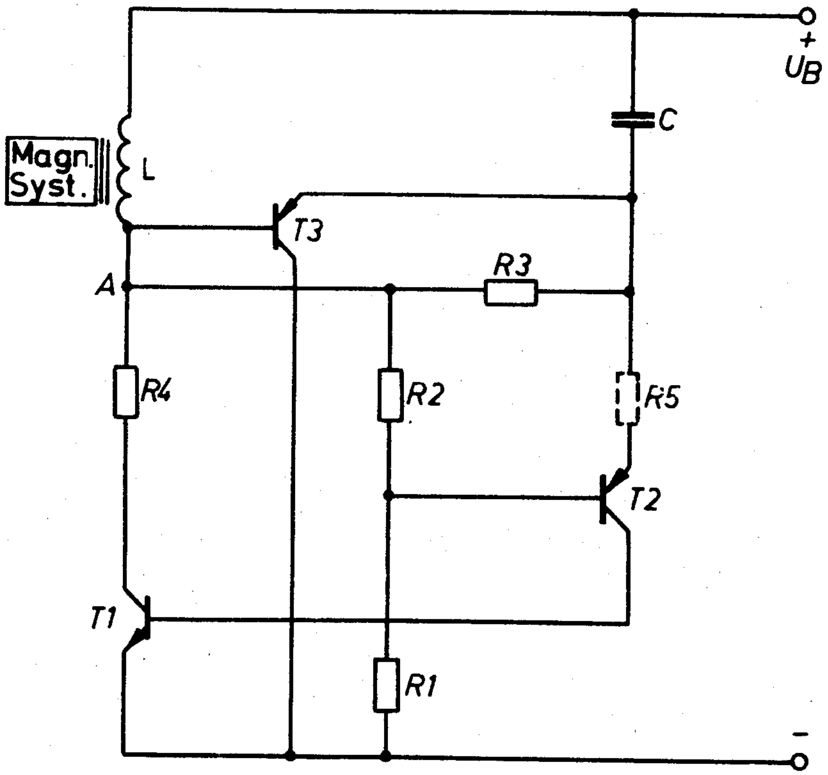
FIG. 4 shows a further embodiment of the inventive circuit.

FIG. 4 shows an advantageous further embodiment of the inventive circuit arrangement. The resistor R4 is inserted between the end of the coil L facing the collector, and the collector of the driving transistor T1. Moreover, there is provided an auxiliary transistor T3 which is complementary to the conductivity type of the driving transistor T1, i.e., provided in such a way that the base thereof is connected to the end of the coil L facing the collector, i.e., to the point A connecting both the resistor R4 and the coil L. The collector thereof is connected to the negative pole of the source of supply voltage $U_B$. The emitter thereof is directly connected to the end of the capacitor C facing the emitter.

According to a further embodiment of the invention a resistor may likewise be inserted between the emitter of the control transistor T2 and the end of the capacitor C facing the emitter, with this resistor being indicated by the dash line and the reference R5 in the drawing.

In the case of a monolithic integration, or when integrating in accordance with one of the customary film techniques, the parameters of the individual circuit elements (values of resistances, current-gain factors of the transistors, and capacity of the capacitor C) are appropriately chosen thus that in cases where the coil L is replaced by an ohmic resistor having a resistance value greater than 10 kilohms, the entire circuit arrangement will oscillate as an astable multivibrator. In this way there is provided a simple measuring-technical means for carrying out a "go" and "no-go" sorting during the mass production of such types of integrated circuits.

By inserting the resistor R4 between the collector of the driving transistor and the end of the coil L facing the collector it is achieved that the pulse-shaped voltage as occuring at the connecting point A and which, after a corresponding voltage division across the resistors R1 and R2, is fed to the base of the control transistor T2, will not drop down to the saturation-voltage level of the driving transistor T1 during the switch-on period of the two transistors, i.e., during the driving pulse, but that the pulse-shaped voltage, also during the driving pulse, still contains information concerning the voltage as induced in the coil by the magnetic system. The capacitor C is charged upon each pulse by the emitter current of the control transistor T2. In consequence of this the operating point of the control transistor is displaced to such an extent that the width of the driving pulse is kept constant. In cooperation with the auxiliary transistor T3 there will thus result a stabilization of the oscillation amplitude of the mechanical oscillator.

In addition to this advantage, the inventive circuit arrangement still offers the added advantage that in the case of an integration during which the coil L and the capacitor C are connected from the outside to the integrated circuit, only three external terminals are required, so that also conventional transistor casings can be used.

It is to be understood that the foregoing description of specific examples of this invention is made by way of example only and is not to be considered as a limitation on its scope.

I claim:

1. A circuit arrangement for driving an electromechanical oscillator, said oscillator including a magnetic system and a single coil magnetically coupled thereto, a source of supply voltage, a driving transistor, a control transistor of complimentary conductivity type to that of said driving transistor, one end of said coil coupled to the collector of said driving transistor, the other end of said coil coupled to one pole of said source of supply voltage, the base of said control transistor being coupled to the collector of said driving transistor, the base of said driving transistor being coupled to the collector of said control transistor, the emitter of said driving transistor being coupled to the other pole of said source of supply voltage, a capacitor, the emitter of said control transistor being coupled to said one pole of said source of supply voltage via said capacitor, a first ohmic resistor, the emitter of said control transistor being DC coupled to said one end of said coil via said first ohmic resistor wherein the improvement comprises:
   - a second ohmic resistor coupled between the collector of said driving transistor and said one end of said coil; and
   - an auxiliary transistor which is complimentary to the driving transistor, the base of said auxiliary transistor connected to the junction of said coil and said second resistor, the collector of said auxiliary transistor connected to said other pole of said source of supply voltage, the emitter of said auxiliary transistor being connected to the junction of said first ohmic resistor and said capacitor.

2. A circuit arrangement according to claim 1, further comprising:
   - a third resistor coupled between the junction of said capacitor and the emitter of said auxiliary transistor, and the emitter of said control transistor.

* * * * *